(12) United States Patent
Wheeler

(10) Patent No.: US 6,398,466 B1
(45) Date of Patent: Jun. 4, 2002

(54) POWER DRIVABLE CHUCK

(75) Inventor: Dale K. Wheeler, Fallston, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/621,081

(22) Filed: Jul. 21, 2000

Related U.S. Application Data (60) Provisional application No. 60/144,826, filed on Jul. 21, 1999.

(51) Int. Cl.[7] ........................ B23B 31/107; B23B 31/173
(52) U.S. Cl. ......................... 408/239 R; 279/24; 279/45; 279/66; 279/74; 279/123; 279/904; 408/226
(58) Field of Search ..................... 279/22, 24, 44, 279/45, 74, 75, 123, 904, 905, 66; 408/226, 239 R, 240

(56) References Cited

U.S. PATENT DOCUMENTS

| | | | |
|---|---|---|---|
| 3,251,605 A | | 5/1966 | Ondeck |
| 3,658,351 A | * | 4/1972 | Benjamin et al. ............. 279/75 |
| 3,788,658 A | * | 1/1974 | Benjamin et al. ............. 279/75 |
| 4,629,375 A | | 12/1986 | Lieser |
| 4,690,641 A | * | 9/1987 | Luiset et al. ................... 279/75 |
| 5,016,892 A | | 5/1991 | Lafforgue et al. |
| 5,340,245 A | | 8/1994 | Bloechle et al. |
| 5,398,946 A | | 3/1995 | Quiring |
| 5,470,084 A | | 11/1995 | Reibtanz et al. |
| 5,558,478 A | | 9/1996 | Odendahl et al. |
| 5,785,448 A | * | 7/1998 | Courgeon et al. ............ 403/325 |
| 5,810,366 A | * | 9/1998 | Montjoy et al. ................ 279/75 |
| 6,261,035 B1 | * | 7/2001 | Moores, Jr. et al. ..... 408/239 R |

* cited by examiner

Primary Examiner—Steven C. Bishop
(74) Attorney, Agent, or Firm—Charles E. Yocum (57) ABSTRACT

A chuck 30 is formed with a generally cylindrical body 54 formed with a bore 60 at a forward end 58 thereof. A fixed clamp segment 134 and a movable clamp segment 166 are located in radial opposition in the bore 60. A pair of ribs 142 are formed on the fixed segment 134 and extend radially inward. A single rib 172 is formed on the movable segment 166 and extends radially inward. The ribs 142 and 172 cooperate to clamp a shank 42 therebetween in a clamping mode. A sleeve 78 is positioned about the body and is movable axially relative thereto. A camming section 88 formed on an interior wall of the sleeve 78 is captured between a head 124 of a pin 122 and a detent ring 132 to latch the sleeve in an unclamped mode. When the shank 42 is inserted into the bore 60, the forward end of the shank engages the pin 122 to move the head 124 against the camming section 88 which, in turn, moves the section past the detent ring. In this manner, the sleeve 78 is unlatched and moved forward to compress a plurality of rollers 196 against the fixed segment 134 and the movable segment 166 to place the sleeve in a clamped mode, whereby the shank 42 is clamped.

33 Claims, 6 Drawing Sheets

POWER DRIVABLE CHUCK

This application claim benefit to provisional application 60/144,826 Jul. 21, 1999.

BACKGROUND OF THE INVENTION

This invention relates to a power drivable chuck, and particularly to a chuck having opposing clamping segments for clamping a shank with the chuck.

For many years, chucks have been used to grip or mount the shanks of bits for a variety of purposes, including the mounting of rotary bits for use with a hand or power tool. In many instances, chucks have included a plurality of movable bit-engaging jaws mounted within an opening of a chuck body. The jaws can be manipulated to clamp the shank of a bit which has been inserted into the opening of the chuck. In this manner, the bit is retained with the chuck which, in turn, is mounted on the hand or power tool. The jaws of such chucks may be operated by use of an external implement, such as a conventional chuck key, or by rotational, or "keyless," elements on the chuck employed in a direct-insertion technique.

Other chucks of the past were designed to allow the bit to be inserted directly into the opening of the chuck using a direct-insertion mounting technique, whereby the bit is locked in assembly with the chuck by virtue of structure within a body of the chuck and on the bit. Such structure includes spherical elements which are typically movable axially and radially, and are in direct contact with the shank being gripped.

There is a need for a chuck which will provide for a sturdy clamping or gripping of the shank in anticipation of significant stresses encountered by the shank during a work effort. Further, there is a need for a chuck which will provide such sturdy clamping or gripping while facilitating a "keyless" or direct-insertion assembly of the shank with the chuck.

While some of the above-noted chucks are adapted to receive and mount the shanks of bits by insertion of the bits directly into the bit-receiving opening of the chuck, the opening is typically designed to receive only shanks of bits with a common diameter or size, consistent with the diameter or size of the opening. Thus, a set of bits of different diameters at the working ends thereof would each be required to have a chuck-mounting shank diameter which is the same as the shank diameter of the remaining bits of the set. This leads to a situation where the bit shank, in order to be strong enough to handle the forces and torques imposed on the larger bits of a range of sizes employed, is much larger than needed, and thus uneconomical, for the smallest bits of the set.

Thus, there is a need for a chuck having structure which will facilitate use of the direct-insertion mounting technique for bits having different shank diameters.

Also, with respect to bits which are formed with chuck-mounting shanks of different diameters, there is a need for uniform structure on such shanks to facilitate assembly of each bit with common structure of the chuck when using a direct-insertion mounting technique.

In addition, there is a need for a chuck and bit assembly having structure which facilitates use of the direct-insertion mounting technique where the parameters of the chuck structure are constant and the parameters of the shanks of the bits fluctuates.

SUMMARY OF THE INVENTION

It is, therefore, an object of this invention to provide a chuck for a sturdy clamping or gripping of a shank of a bit in anticipation of significant stresses encountered by the shank during a work effort.

Another object of this invention is to provide such sturdy clamping or gripping of the shank while facilitating use of a direct-insertion assembly of the shank with the chuck.

Still, another object of this invention is to provide a chuck having structure which will facilitate use of the direct-insertion mounting technique for bits having different shank diameters.

A further object of this invention is to provide a chuck having structure which facilitates use of the direct-insertion mounting technique where the parameters of the chuck structure are constant and the parameters of the shanks of the bits fluctuates.

With these and other objects in mind, this invention contemplates a power drivable chuck for receiving and clamping a shank, which includes a body having a bore therein formed about an axis thereof. A first clamping segment is located within a first portion, and spaced from the axis, of the bore and is mounted to preclude movement of the segment toward the axis. A second clamping segment is located opposite the first clamping segment within a second portion, and spaced from the axis, of the bore and is mounted to facilitate movement of the segment toward the axis. A first-segment shank-engaging rib extends from the first clamping segment toward the axis, and a second-segment shank-engaging rib extends from the second clamping segment. Means are provided for urging the second clamping segment toward the first clamping segment to clamp the shank therebetween.

This invention further contemplates a power drivable chuck for receiving and clamping a shank, including a body having a bore therein formed about an axis thereof. A first clamping segment is located within a first portion, and spaced from the axis, of the bore. A second clamping segment is located opposite the first clamping segment within a second portion, and spaced from the axis, of the bore. Means are provided for moving at least one of the first and second segments toward the axis of the bore to clamp any shank therebetween. A sleeve is positioned about the body and is movable in an axial direction relative to the body between a retracted position, in which the sleeve is in an unclamped mode, and a forward position, in which the sleeve is in a clamped mode. Means are provided for latching the sleeve wherein the sleeve is latched in the unclamped mode. Means, responsive to the insertion of the shank into the bore of the body, are provided for unlatching the sleeve to allow the sleeve to move toward the forward position.

This invention also contemplates a power drivable chuck for receiving and clamping a shank formed with at least one axially-directed rib, and includes a body having a bore therein formed about an axis thereof. A first clamping segment is located within a first portion, and spaced from the axis, of the bore and is mounted to preclude movement of the segment toward the axis. A second clamping segment is located opposite the first clamping segment within a second portion, and spaced from the axis, of the bore and is mounted to facilitate movement of the segment toward the axis. A first-segment shank-engaging rib extends from the first clamping segment toward the axis. A second-segment shank-engaging rib extends from the second clamping segment. The first-segment rib and the second-segment rib are spaced apart to form at least one spaced groove therebetween for receipt of the rib formed on the shank. Means are provided for urging the second clamping segment toward the first clamping segment to clamp the shank therebetween.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
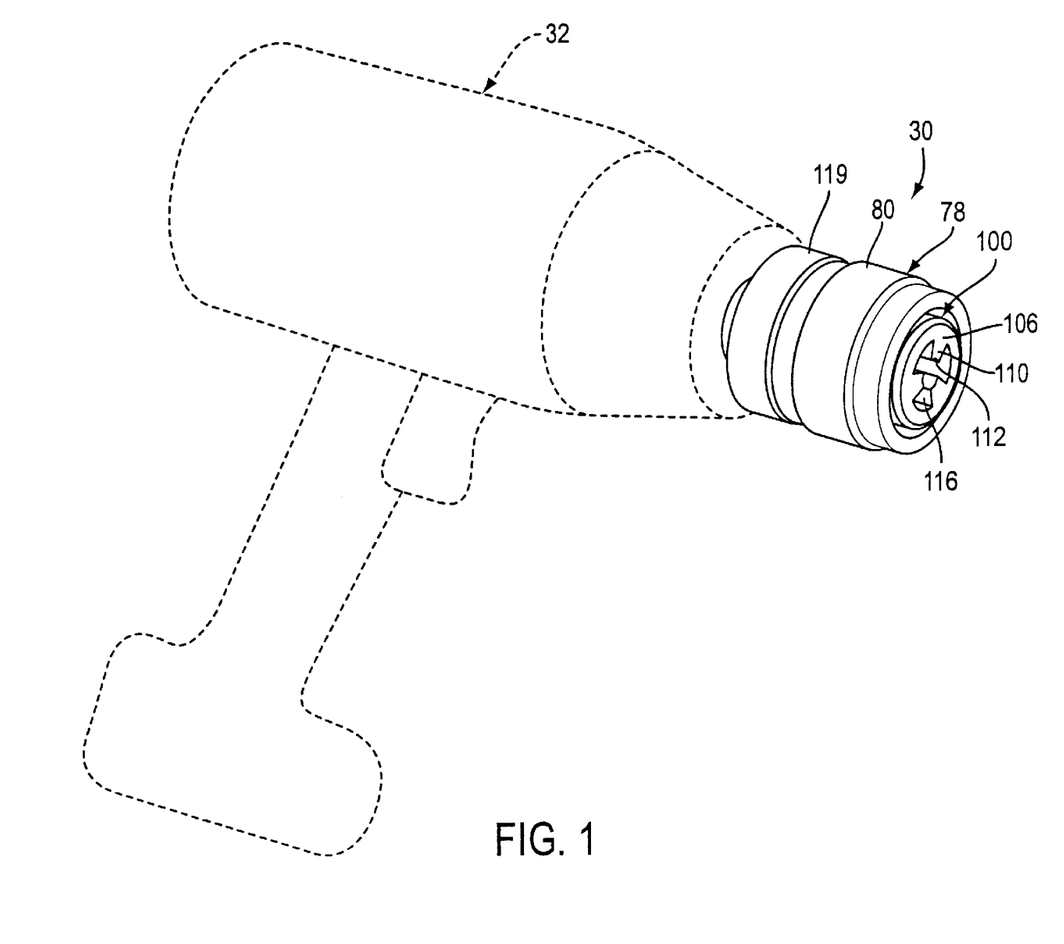
FIG. 1 is a perspective view showing a chuck, in accordance with certain principles of the invention, mounted on a drill.
Figure 9:
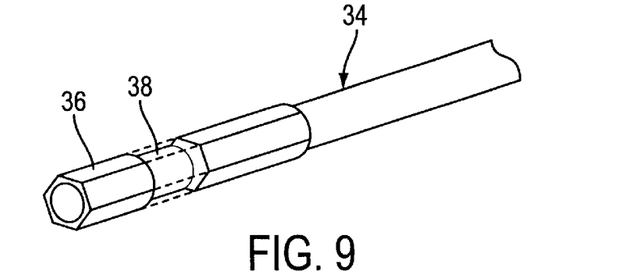
FIG. 9 is a perspective view showing a bit having a shank with a hexagonal cross section.

Referring to FIG. 1, a chuck 30 can be coupled to a power driver such as, for example, a drill 32, shown in phantom, for rotating the chuck. The chuck 30 is designed to receive and grip differently configured shanks of a plurality of bits, including a bit 34 (FIGS. 3 and 9) having a hex shank 36, with or without an illustrated groove 38 (FIG. 9). The chuck 30 is also designed to receive a bit 40 (FIGS. 2 and 3) having a round shank 42, a bit 44 (FIG. 10) and a bit 46 (FIG. 11), each having a round shank 48 with axially-directed ribs 50 and axially-directed grooves 52.

Bits having other shank designs may also be received and gripped by the chuck 30, such as, for example, the bits disclosed in a now-abandoned patent application identified by U.S. Ser. No. 60/108,336, filed on Nov. 13, 1998, and its successor pending nonprovisional patent application identified by U.S. Ser. No. 09/439,505, filed on Nov. 12, 1999, the disclosures of which are incorporated herein by reference thereto.

Figure 2:
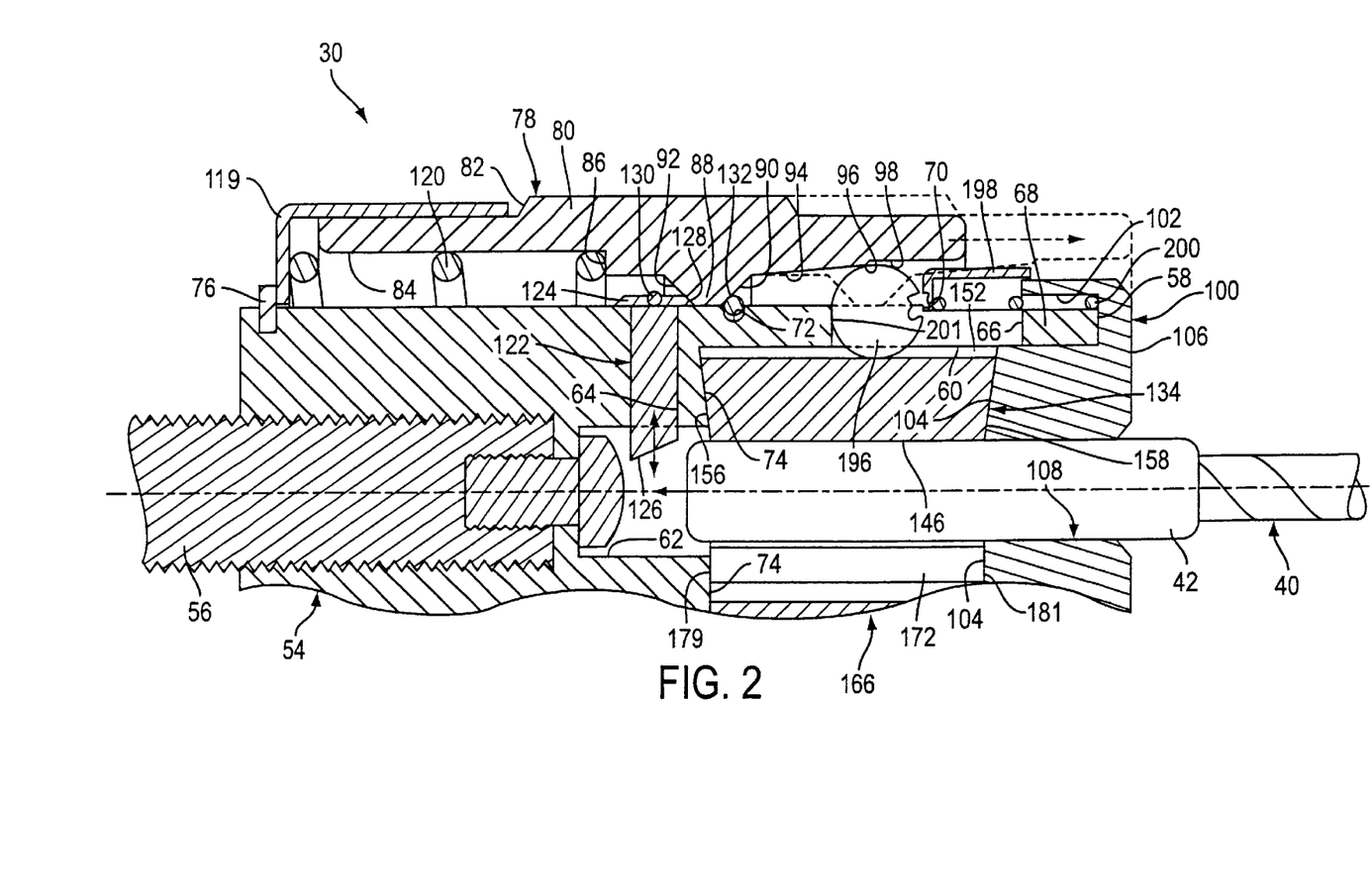
FIG. 2 is a sectional side view showing a shank of a bit in assembly within the chuck of FIG. 1, in accordance with certain principles of the invention.
Figure 3:
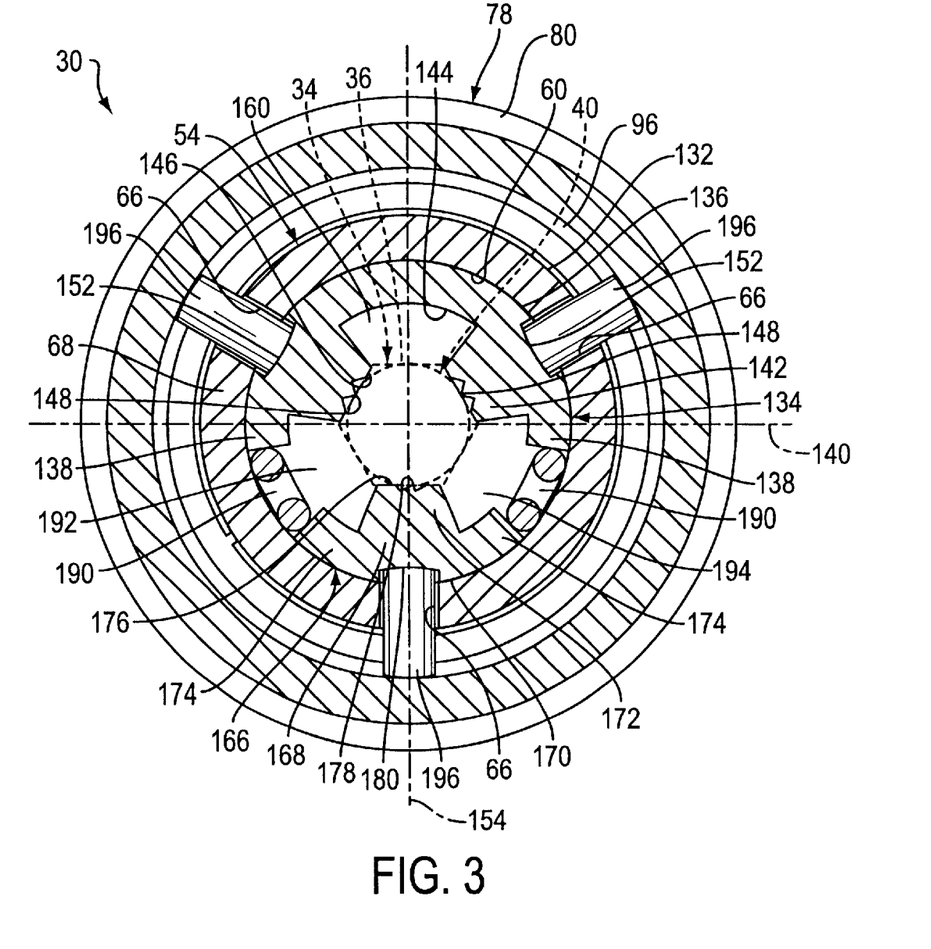
FIG. 3 is a sectional view showing the shank of bits in assembly with the chuck of FIG. 1, in accordance with certain principles of the invention.

Referring to FIG. 2, the chuck 30 includes a generally cylindrical chuck body 54 which is threadedly coupled to a spindle 56 extending from the drill 32. The body 54 is formed axially in a forward end 58 thereof with a large bore 60, and axially in an intermediate portion of the body with a small bore 62, which is in axial communication with the large bore 60 to form a bit-receiving opening in the chuck body. A transaxial opening 64 is formed in the chuck body 54, and through the periphery of the body and the small bore 62. Three closed slots 66 are formed, in an axial direction, through a wall 68 of the body 54 adjacent the large bore 60, and are equally spaced about the axis of the body as shown in FIG. 3. As further shown in FIG. 2, an annular shoulder 70, which is coincidental with an intermediate portion of each of the slots 66, and an annular groove 72, are formed in the periphery of the body 54. The chuck body 54 is formed with a circular base surface 74 at the axial base of the large bore 60, which extends between an inside surface of the wall 68 to the small bore 62, and is sloped at a small angle such that the edge of the base surface, which is closer to the axis of the body, extends toward the forward end 58 of the body. The body 54 is also formed with an outer annular groove for receipt of a flat washer-like retention ring 76.

A generally cylindrical sleeve 78 is positioned about the chuck body 54 for forward and rearward movement along the axis of the body. The sleeve. 78 is formed with a radially outward band 80 about an intermediate portion thereof, and includes a rear surface 82. The sleeve 78 is formed with an axial opening, including a counterbore 84, having a base or floor 86, between an intermediate section and a rear end of an inner wall of the axial opening.

An annular, radially-inward, camming section 88 is formed at the intermediate section of the axial opening of the sleeve 78, and includes a forward cam surface 90, which slopes at a first cam angle, and a rear cam surface 92, which slopes at a second cam angle. The remainder of the inner wall of the axial opening of the sleeve 78 is formed by (1) a gradually sloping surface section 94, which slopes radially away from the axis of the sleeve as the section extends toward a forward end of the sleeve, (2) a comparatively more drastic sloping surface section 96 of short axial length, and (3) a forward surface section 98 of a generally constant diameter.

An end cap 100 is located at the forward end of the chuck 30, and is press fit onto the wall 68 of the body 54 at the forward end 58 thereof. The end cap 100 is formed with a cup-like opening 102 which receives the forward end 58 of the body 54, and is slightly greater in radial width than the forward end of the wall to form a spring-receiving chamber. A rear circular surface 104 of the end cap 100 is spaced axially and forward of the base surface 74 of the chuck body 54. The rear surface 104 is sloped at an angle which is the same as the angle of the base surface 74, but is sloped in the opposite direction such that the spaced surfaces 74 and 104 are on converging paths toward the axis of the chuck 30.

Figure 6:
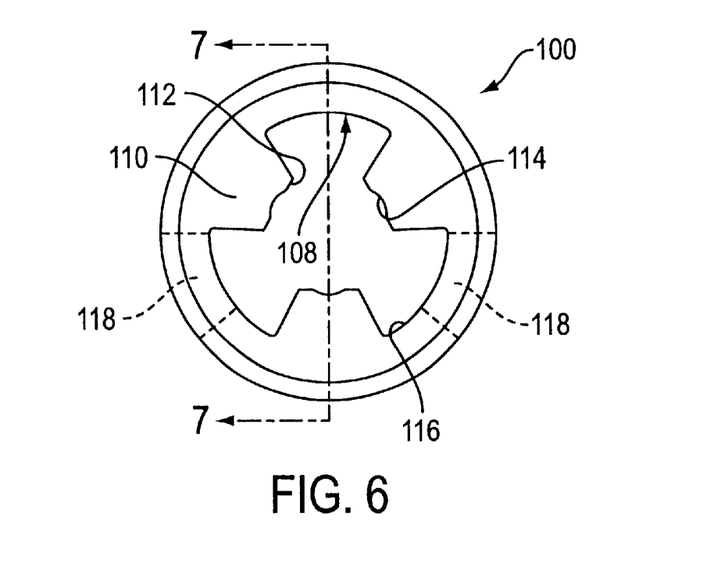
FIG. 6 is an end view showing a cap of the chuck of FIG. 1, in accordance with certain principles of the invention.
Figure 7:
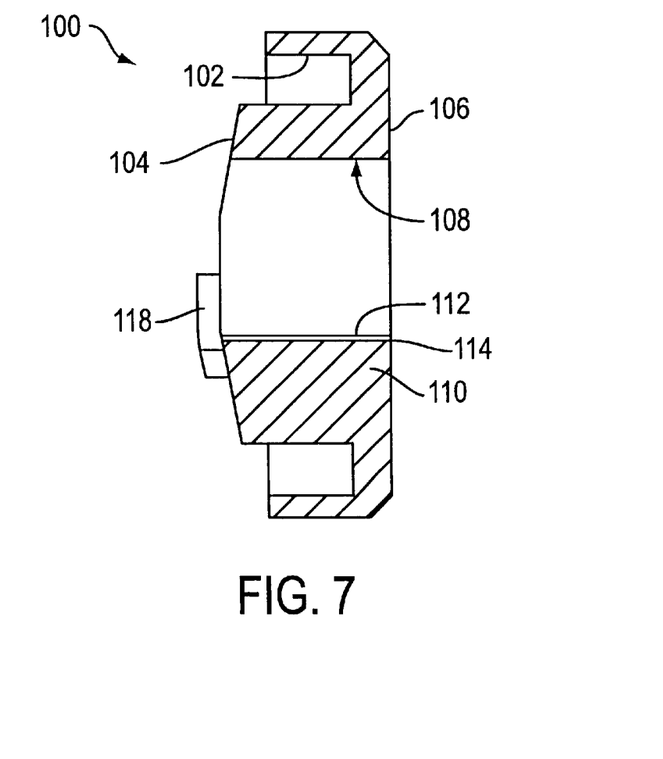
FIG. 7 is a sectional side view showing the cap of FIG. 6, in accordance with certain principles of the invention.

As shown in FIGS. 6 and 7, the end cap 100 is further formed with a front surface 106 and a shank-receiving opening 108, which extends axially therethrough. Three equally spaced, axially extending ribs 110 extend radially into the opening 108 and are formed with substantially flat, radially inboard surfaces 112. Slight concave arcuate depressions 114 are formed centrally in the flat surfaces 112, and extend between the front surface 106 to the rear surface 104 of the end cap 100. The spaces between adjacent ribs 110 form three equally spaced grooves 116. A pair of spaced lugs 118 are formed in a prescribed shape and extend from the rear surface 104 of the end cap 100.

Referring again to FIG. 2, a spring and sleeve retainer 119 is placed over rear portions of the chuck body 54 and the sleeve 78, and is positioned forward of the retention ring 76 to retain (1) a spring 120 within the counter bore 84, and (2) the sleeve with the chuck body. The spring 120 continuously urges the sleeve 78 in a direction toward the forward end of the chuck 30. A pin 122 is located in the transaxial opening 64 formed in the chuck body 54, and is formed with a head 124 at one end thereof and a slanted surface 126 at an opposite end closest to the axis of the chuck body. The head 124 is formed with a bevelled edge 128 at an angle which is complementary to the angle of the rear cam surface 92 of the sleeve 78. A slot is formed in a radially outboard surface of the head 124. A spring ring 130 extends around. the chuck body 54 and through the slot formed in the outer surface of the head 124. The spring ring 130 retains the pin 122 in the position illustrated in FIG. 2, but allows the pin to be moved radially away from the axis of the chuck 30 when urged to do so, and to return to the illustrated position when the urging force is removed. A split detent ring 132 is located in the annular groove 72 of the chuck body 54, and normally extends radially and partially out of the groove as illustrated, but can be urged nearly fully into the groove.

Referring to FIG. 3, a powdered metal, fixed, clamp segment 134 is formed with a circular-shaped, outboard peripheral surface 136, which extends through an angular distance greater than one-hundred and eighty degrees. For example, the surface 136 extends through an arc of approximately two hundred degrees, with each of two leg portions 138, on opposite arc ends of the segment 134, extending ten degrees below a horizontal centerline 140. The circular-shaped surface 136 of the segment 134 is complementary to the inner circular wall of the bore 60 formed axially in the chuck body 54, and is nested in an interfacing, fixed engagement with the circular wall of the bore as shown in FIG. 3.

The segment 134 is formed with a pair of ribs 142 located equally on opposite sides of a vertical centerline 154, which extend radially inward from an inside wall 144 of the segment. Each rib 142 is formed with a flat radially inboard surface 146 which, in turn, is formed with a centrally located large tooth 148.

A pair of spaced slots 152 are formed in the peripheral surface 136, and are spaced equally on opposite sides of a vertical centerline 154 shown in FIG. 3. As shown in FIG. 2, the slots 152 (one shown) extend from a first or rearward end 156 of the segment 134 to a second or forward end 158 thereof. The segment 134 is assembled within a space between the spaced surfaces 74 and 104 of the chuck body 54 and the end cap 100, respectively. The first end 156 of the segment 134 is formed at an angle which is complementary to the angle of the surface 74, and is in interfacing engagement with the surface 74. The second end 158 of the segment 134 is formed at an angle which is complementary to the angle of the surface 104, and is in interfacing engagement with the surface 104.

As shown in FIG. 3, a groove 160 is formed between the ribs 142 of the segment 134. When the segment 134 is assembled within the bore 60, the leg sections 138 extend below the horizontal centerline 140 whereby the segment is essentially fixed in a radial direction.

Figure 4:
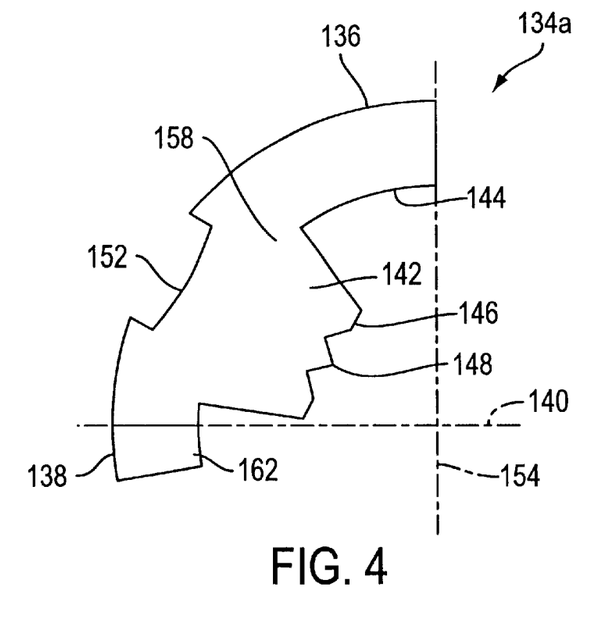
FIG. 4 is a plan view of a portion of a first clamping segment with a rib, in accordance with certain principles of the invention.

Referring to FIG. 4, by using a cold drawn process, or a powdered metal process, the segment 134 of FIG. 3 can be formed by two half segments, one of which is illustrated in FIG. 4 as a half segment 134*a*. Another half segment (not shown) would be mated, in interfacing engagement, with the half segment 134*a* along the vertical centerline 154 to form a segment structure which would function in the same manner as the full segment 134. In FIG. 4, the numerals used to identify the various structural features of the half segment 134*a* are the same as the numerals used to identify the same features of the segment 134 in FIG. 3. Referring again to FIG. 4, a surface 162 of the leg portion 138 is on a lower plane than a plane of the end surface 158 of the remainder of the half segment 134*a*. The leg portion of the other half segment (not shown) is formed in the same manner. Further, the leg portions 138 of the segment 134 of FIG. 3 are each formed in the same manner as the leg portion 138 of the half segment 134*a* of FIG. 4.

Figure 5:
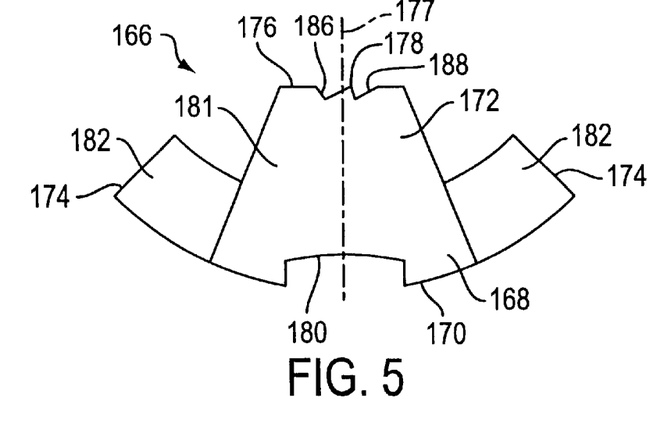
FIG. 5 is a plan view of a second clamping segment with a rib, in accordance with certain principles of the invention.

Referring to FIGS. 3 and 5, a movable clamp segment 166 is formed with a central body 168 with an arcuate surface 170 which is complementary to the inner circular wall of the bore 60 of the chuck body 54, and is assembled in an interfacing relation with the inner circular wall as shown in FIG. 3, but is movable relative thereto along the vertical centerline 154.

The clamp segment 166 is formed with a rib 172 which extends radially inward from the body 168, and a pair of leg sections 174 extending from opposite sides of the body. The rib 172 is formed with a flat radially-inboard surface 176 having a tooth 178 which extends between a first or rearward end 179 (FIG. 2) and a second or forward end 181 (FIG. 2) at opposite ends of the clamp segment 166. The peak of the tooth 178 is offset from a vertical centerline 177 (FIG. 5) of the clamp segment 166 to provide a self-tightening feature. As shown in FIG. 5, a pair of grooves 186 and 188 are shown on each side of the tooth 178 of the rib 172, with the angle of the groove 186 being greater than the angle of the groove 188. As. shown in FIGS. 3 and 5, a slot 180 is formed in the arcuate surface 170 of the body 168, and extends from the first or rearward end 179 of the clamp segment 166 to the second or forward end 181 of the clamp.

As shown in FIG. 2, the clamp segment 166 is assembled within the space between the spaced surfaces 74 and 104 of the chuck body 54 and the end cap 100, respectively, which are structured to allow movement toward and away from the axis of the chuck body 54. The leg sections 174. are each formed with a surface 182 which is located in a plane which is lower than a plane in which the end 181 of the body 168 is located.

As shown in FIG. 3, the clamp segment 166 is mounted within the bore 60 of the chuck body 54, and the leg portions 174 interface with, but are spaced from, the leg portions 138 of the segment 134. A pair of hair pin springs 190 are inserted into the spaces between the adjacent sets of the leg portions 138 and 172, and maintain an urging force on the clamp segment 166. With this arrangement, the clamp segment 166 can be moved along a radial path coincidental with the vertical centerline 154. Also, a pair of grooves 192 and 194 are formed between the rib 172, on the one hand, and respective ones of the ribs 142, on the other hand.

Referring to FIGS. 2 and 3, a major intermediate portion of each of three rollers 196 are located in a respective one of the slots 66 of the chuck body 54, with two of the rollers extending slightly radially inward into the slots 152 of the segment 134 and the other roller extending slightly radially inward into the slot 180 of the clamp segment 166. The rollers 196 also extend radially outward into engagement with portions of at least the sloping surface section 94 of the sleeve 78. Referring to FIG. 2, a roller retainer 198 is positioned forward of the rollers 196 and is urged rearward by a spring 200, a forward portion of which is located in the chamber formed by the opening 102 of the end cap 100, to maintain the rollers in the position illustrated in FIG. 2 when the sleeve 78 is in the position shown in solid.

This insures that each of the rollers 196 are urged by the spring 200 into engagement with a rearward end 201 of each respective slot 66 so that the rollers are all in a common, registered location at the instant the sleeve 78 is unlatched, and the process of clamping the shank 42 begins. Also, the rollers function as Woodruff keys between the chuck body 54, on the one hand, and the segment 134 and the clamp segment 166, on the other hand. In this manner, the rollers 196, as well as the lugs 118 of the end cap 100, transmit torque to the shank 42 of the bit 40.

It is noted that, the ribs 110 of the end cap 100 are to be aligned, in an axial direction, with respective ones of the ribs 142 of the segment 134 and the rib 172 of the clamp segment 166. When the elements of the chuck 30 are assembled, the lugs 118 (FIGS. 6 and 7) will register and interface with the surfaces 162 of the leg sections 138 of the segment 134, and thereby insure proper registration of the three ribs 110 with the two ribs 142 and the single rib 172.

Referring to FIG. 2, when the chuck 30 is to be used, an operator moves the sleeve 78 from the dashed-line, or at-rest, position to the rear, or solid-line, position whereby the spring 120 is compressed. During this maneuver, the cam surface 92 and the bottom of the camming section 88 urge the detent ring 132 sufficiently into the groove 72 to allow the sleeve 78 to be moved to the rear position. The cam surface 92 engages the bevelled edge 128 of the pin 122 and serves as a rearward stop for movement of the sleeve 78. The detent ring 132 is allowed to move partially out of the groove 72 into engagement with the cam surface 90 whereby the sleeve 78 is latched in the rear position. Thus, a means for latching the sleeve 78 is thereby formed.

At this time, the rollers 196 have located adjacent the forward end of the sloping surface section 94, which relaxes the application of radially inward forces against the rollers. While the segment 134 is fixed, and the rollers 196 associated therewith insure the fixed condition of the segment, the relaxed roller 196 associated with the clamp segment 166 allows the clamp segment to move to an open or relaxed position.

As noted above, the rollers 196 are urged against the rearward ends 201 of the respective slots 66 for appropriate registration of the rollers in anticipation of the clamping of the shank 42 of the next inserted bit 40. Further, the chuck 30 could function with a single roller 196 in place of the two rollers which are associated with the fixed segment 134, and would be located directly opposite the single roller 196 which is associated with the clamp segment 166. Use of the single roller 196 in place of the two fixed-segment rollers, and located as noted above, will increase the clamping force applied to the shank 42.

The round shank 42 of the bit 40, or the hex shank 36 of the bit 34 (FIG. 9), with or without the groove 38, can be inserted freely axially into the space defined by the flat surfaces 146 of the ribs 142 and the flat surface 176 of the rib 172 as shown in FIG. 2. As the rear of the shank 42 approaches the rearmost position, the shank engages the slanted surface 126 and urges the pin 122 radially outward against the retention force of the spring ring 130.

As the pin 122 is moved outward, the bevelled edge 128 of the pin is moving relatively upward on the sleeve cam surface 92 to urge the sleeve 78 in the forward direction. The sleeve cam surface 90 then urges the detent spring 88 into the groove 72, and the biased energy of the compressed spring 120 urges the sleeve 78 fully in the forward direction. Thus, this provides a means, which is responsive to the insertion of the shank 42 into the bore 60 of the body 54, for unlatching the sleeve 78.

As the sleeve 78 moves forward, the sloping surface section 94 of the sleeve moves the rollers 196, from their registered positions, in the forward direction against the biasing action of the spring 200, and also wedges the rollers between the sloping section 94, on one side thereof, and the segment 134 and the clamp segment 166, on an opposite side thereof. In this manner as described above, the urging of the sleeve 78 by the spring, in conjunction with the sloping surface section 94 and the roller 196 associated with the clamp segment 166, provides a means for urging the movable clamp segment 166 toward the fixed segment 134 to clamp the shank 42 with the chuck 30.

The flat face 176 of the clamp segment 166 is thereby moved into frictional gripping engagement with the shank 42 of the bit 40, and urges other portions of the shank into frictional gripping engagement with the flat surfaces 146 of the fixed segment 134. The wedged rollers 196, which engage the fixed segment 134, provide a radially-inward force against the fixed segment 134 which enhances the frictional gripping of the shank 42. It is noted that the teeth 148 and 178 are biased to enhance the gripping of the round shank 42 upon rotation of the bit 40, which is analogous to the gripping provided in a conventional chuck with three movable jaws.

In order to remove the bit 40 from the chuck 30, the operator moves the sleeve 78 in a rearward direction to a location where the wedging of the rollers 196 is relieved sufficiently to allow the bit to be removed. The arcuate depressions 114 formed in the flat surfaces 112 of the end cap 100 allow for slight wobbling, by hand, of a chuck-mounted round-shank bits to facilitate the removal of such bits.

Figure 10:
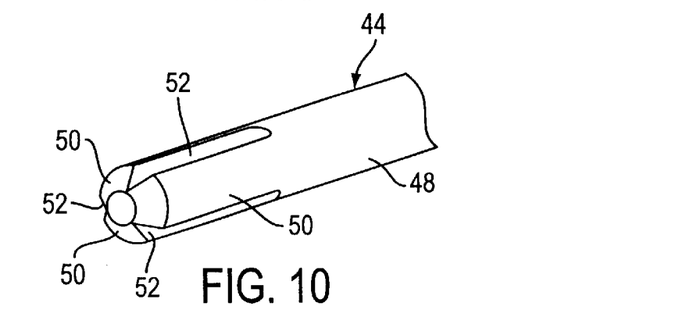
FIG. 10 is a perspective view showing a bit having a round shank with three axially-directed grooves formed with a "V" shaped cross section.
Figure 11:
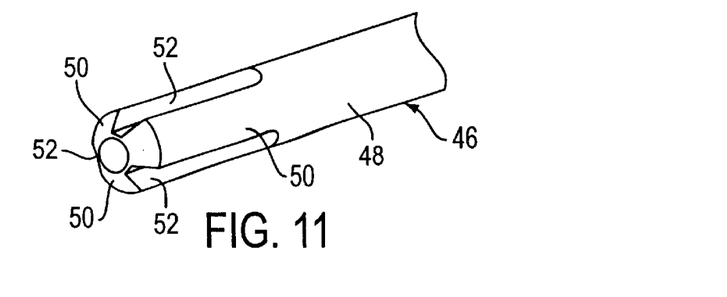
FIG. 11 is a perspective view showing a bit having a round shank with three axially-directed grooves formed generally with a "U" shaped cross section.

Each of the bits 44 and 48, which are illustrated in FIGS. 10 and 11, respectively, are formed with the ribs 50 and the grooves 52 in the shank 48 thereof. Also, the bits illustrated in the above-noted pending application are formed with ribs and grooves. Bits with the rib-and-groove shank structure noted above, can be assembled within the above-described chuck 30. For example, referring to. FIG. 2, the sleeve 78 of the chuck 30 is latched as described above. Referring to FIG. 3, the shank 48 of the bit 46 (FIG. 11) is axially aligned with the axis of the chuck 30 such that the ribs 50 of the bit are aligned with the grooves 160, 192 and 194 of the chuck, and the grooves 52 of the bit are aligned with the ribs 142 and 172 of the chuck. The shank 48 of the aligned bit 46 is then inserted into the shank-receiving opening of the chuck 30, whereby the sleeve 78 is unlatched in the manner described above, and the clamp segment 166 is moved by the associated wedged roller 196 to frictionally grip the shank 48 between the roller-backed fixed segment 134 and the roller-backed clamp segment.

Figure 8:
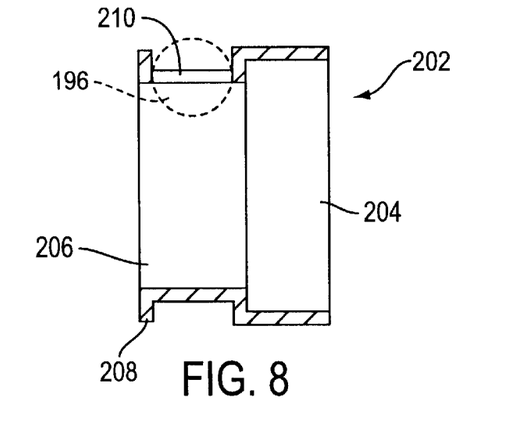
FIG. 8 is a sectional side view showing a roller retainer of the chuck of FIG. 1, in accordance with certain principles of the invention.

Referring to FIG. 8, a roller retainer 202 is formed with a cylindrically shaped, counter-bored forward section 204 which is substantially the same as the roller retainer 198 shown in FIG. 2. The retainer 202 further includes a cylindrical rear section 206 which is integrally formed with a flange 208 at the rear thereof and three slots 210 (one shown) formed in the rear section as a nest for each of the three rollers 196. The retainer 202 could be used in place of the retainer 198.

It is noted that, following the removal of any bit from the chuck 30, the operator may choose to retain the bit-less chuck in the latched mode. When the next bit is inserted into the shank-receiving opening, the latched chuck 30 is already prepared for receipt of the shank, and doesn't require the additional step of retracting the sleeve 78. This provides for a rapid loading process, requiring only a single manual retraction of the sleeve 78 for the loading and unloading of each bit.

Since the fixed segment 134 is essentially fixed in its mounting within the bore 60 of the chuck body 54, the opportunity exists for providing a chuck with an average zero run-out, when using bits of nominal width dimensions for hex-shank bits or nominal diameters for round-shank bits. To accomplish an average zero run-out with the chuck 30, the shank-receiving bore 60 is ideally formed at a nominal diameter. The thickness of the fixed segment 134, as measured from the inner wall of the bore 60 to the flat surface 146 of each of the ribs 142, is ideally formed at a nominal thickness, which is slightly thicker than its normal thickness. When a bit having a nominal shank width or diameter dimension is loaded into such a chuck, the movable clamp segment 166 urges the shank into engagement with the flat surfaces 146 to essentially locate the bit on a common axis with the fixed segment 134 and the bore 60 to provide zero run-out. If there are any variations from the nominal of the shank size, the thickness of the fixed segment 134 or the diameter of the bore 60, a run-out to the left or to the right, which is parallel run-out, will occur rather than run-out all to one side, which is angular run-out, and most undesirable.

In general, the above-identified embodiments are not to be construed as limiting the breadth of the present invention. Modifications, and other alternative constructions, will be apparent which are within the spirit and scope of the invention as defined in the appended claims.

What is claimed is:

1. A power drivable chuck for receiving and clamping a shank, which comprises:

a body having a bore therein formed about an axis thereof;

a first clamping segment located within a first portion, and spaced from the axis, of the bore and mounted to preclude movement of the segment toward the axis;

a second clamping segment located opposite the first clamping segment within a second portion, and spaced from the axis, of the bore and mounted to facilitate movement of the segment toward the axis;

a first-segment shank-engaging rib extending from the first clamping segment toward the axis;

a second-segment shank-engaging rib extending from the second clamping segment; and means for urging the second clamping segment toward the first clamping segment to clamp the shank therebetween.

2. The power drivable chuck as set forth in claim 1, which further comprises:

the first-segment rib and the second-segment rib being spaced apart to form spaced grooves therebetween.

3. The power drivable chuck as set forth in claim 1, which comprises:

the first-segment rib being located directly opposite the second-segment rib.

4. The power drivable chuck as set forth in claim 1, wherein the first-segment shank-engaging rib is a first rib, and which further comprises:

a second first-segment shank-engaging rib extending from the first clamping segment toward the axis and spaced from the first-segment rib.

5. The power drivable chuck as set forth in claim 4, which further comprises:

the first and second first-segment ribs and the second-segment rib being spaced apart to form spaced grooves therebetween.

6. The power drivable chuck as set forth in claim 4, which further comprises:

the bore of the body is cylindrical; and the first and second first-segment ribs, and the second-segment rib, being spaced equally circumferentially within the bore of the body.

7. The power drivable chuck as set forth in claim 1, which further comprises:

the bore of the body is formed with a cylindrical wall; and the first clamping segment is arcuate in shape in a manner complementary to the cylindrical wall of the bore to facilitate axial positioning of the first clamping segment within the bore and in engagement with the cylindrical wall.

8. The power drivable chuck as set forth in claim 7, which further comprises:

the arcuate shape of the first clamping segment extends through an angle of one-hundred and eighty degrees or greater which, within the bore, allows for axial movement of the first clamping segment and precludes radial movement thereof.

9. The power drivable chuck as set forth in claim 1, which further comprises:

the second clamping segment is arcuate in shape in a manner complementary to the cylindrical wall of the bore to facilitate axial positioning of the first clamping segment within the bore and in engagement with the cylindrical wall; and the arcuate shape of the second clamping segment extends through an angle of less than one-hundred and eighty degrees which, within the bore, allows for axial movement of the second clamping segment and radial movement thereof.

10. The power drivable chuck as set forth in claim 1, which further comprises:

the body formed with a front end in which a front opening of the bore is formed;

a base surface formed within the bore at an angle with the axis of the bore and at a distance from the front opening thereof;

the first and second clamping segments located within the bore and having inboard portions in engagement with the base surface; and a cap attached to the body and having portions in engagement with outboard portions of the first and second clamping segments to capture the first and second clamping segments between the base surface and the cap to preclude axial movement of the segments.

11. The power drivable chuck as set forth in claim 10, which further comprises:

the cap is formed with an opening having an axis coincidental with the axis of the bore when the cap is attached to the body; and a plurality of spaced ribs, equal in number to the number of ribs of the first and second clamping segments, extending radially inward toward the axis of the opening of the cap.

12. The power drivable chuck as set forth in claim 11, which further comprises:

the cap and at least one of the first and second clamping segments being formed with complementary structure to facilitate alignment of the ribs of the cap with the ribs of the clamping segments.

13. The power drivable chuck as set forth in claim 1, which further comprises:

at least one slot formed in a peripheral surface of the first clamping segment; and a roller positionable partially through the body and radially into the bore thereof for providing proper locating of the first clamping segment within and relative to the bore.

14. The power drivable chuck as set forth in claim 1, which further comprises:

at least one spring located between adjacent circumferential portions of the first and second clamping segments to maintain an urging force therebetween.

15. The power drivable chuck as set forth in claim 1, which further comprises:

the ribs of the first and second clamping segments each being formed with an engagement surface for engaging the shank after insertion thereof into the bore of the body and upon clamping activation of the first and second clamping segments; and at least one of the engagement surfaces being formed with a tooth for engagement with the adjacent portion of the shank.

16. The power drivable chuck as set-forth in claim 1, which further comprises:

the rib of the second clamping segment being formed with an engagement surface for engaging the shank after insertion thereof into the bore of the body and upon clamping activation of the first and second clamping segments;

the rib of the second-clamping segment formed with opposite sides which are located equally from a side-to-side centerline thereof;

a tooth formed on the engagement surface of the second clamping segment having a peak located closest to, and spaced from, the axis of the bore of the body; and the peak of the tooth being offset from the centerline of the second clamping segment.

17. The power drivable chuck as set forth in claim 16, which further comprises:

a first groove formed in, and at a first angle with respect to, the engagement surface of the second clamping segment and located on a first side of the tooth formed therein;

a second groove formed in, and at a second angle with respect to, the engagement surface of the second clamping segment and located on a second side of the tooth formed therein; and the first and second angles being different.

18. The power drivable chuck as set forth in claim 1, wherein the means for urging comprises:

a sleeve positioned about the body and movable in an axial direction relative to the body;

a biasing element located between the sleeve and the body for normally urging a forward end of the sleeve toward a forward end of the body whereat the sleeve is in a segment-clamping position; and a roller located between the second segment and the sleeve for radially-inward compressive engagement with the second segment when the sleeve is in the segment-clamping position.

19. The power drivable chuck as set forth in claim 17, which further comprises:

the sleeve formed with an inner wall which is sloping in an axial direction from a first axial end to a second axial end of the inner wall such that the roller, which is in engagement with the second clamping segment, is gradually radially urged toward the axis of the bore to move the second clamping segment into clamping position with the shank as the sleeve is being moved to the segment-clamping position.

20. The power drivable chuck as set forth in claim 1, which further comprises:

a sleeve positioned about the body and movable in an axial direction relative to the body between a retracted position, in which the sleeve is in an unclamped mode, and a forward position, in which the sleeve is in a clamped mode;

means for latching the sleeve wherein the sleeve is latched in the unclamped mode; and means, responsive to the insertion of the shank into the bore of the body, for unlatching the sleeve to allow the sleeve to move to the forward position.

21. The power drivable chuck as set forth in claim 20, wherein the means for latching comprises:

a radially-inwardly extended section formed in an opening of the sleeve;

a head located on an outer periphery of the body along an intermediate section of the body, a detent mounted on the periphery of the body spaced axially from the head in a direction toward a front end of the body;

the extended section of the sleeve being located between the head and the detent when the sleeve is in the unclamped mode to preclude any movement of the sleeve toward the position of the clamped mode thereof.

22. The power drivable chuck as set forth in claim 21, wherein the means for unlatching comprises:

an opening formed through the body between the outer periphery of the body and the bore thereof; and a pin attached to the head and located in the opening formed through the body and having a portion extending into the bore of the body in the path of any shank inserted into the bore of the body, where, a forward end of the shank being inserted into the bore engages the portion of the pin extending into the bore and urges the pin and the head outward whereby an engaging portion of the head engages an engaging portion of the extended section of the sleeve to move the extended section past the detent to allow the sleeve to be moved toward the clamped position thereof.

23. The power drivable chuck as set forth in claim 22, which further comprises:

the engaging portions of the head and the extended section are formed with complementary bevelled surfaces to enhance movement of the sleeve upon outward movement of the pin.

24. The power drivable chuck as set forth in claim 21, which further comprises:

an annular groove formed in the periphery of the body forward of the head; and the detent formed by a split ring which is locatable within the annular groove and normally extends partially outward of the groove.

25. A power drivable chuck for receiving and clamping a shank, which comprises:

a body having a bore therein formed about and axis thereof;

a first clamping segment located within a first portion, and spaced from the axis, of the bore;

a second clamping segment located opposite the first clamping segment within a second portion, and spaced from the axis, of the bore;

means for moving at least one of the first and second segments toward the axis of the bore to clamp any shank therebetween;

a sleeve formed with an axial opening having a wall, where the sleeve is positioned about the body and movable in an axial direction relative to the body between a retracted position, in which the sleeve is in an unclamped mode, and a forward position, in which the sleeve is in a clamped mode;

means formed on the sleeve inward of the wall of the opening for latching the sleeve wherein the sleeve is latched in the unclamped mode; and means, responsive to the insertion of the shank into the bore of the body, for unlatching the sleeve to allow the sleeve to move toward the forward position.

26. A power drivable chuck for receiving and clamping a shank, which comprises:

a body having a bore therein formed about an axis thereof;

a first clamping segment located within a first portion, and space from the axis, of the bore;

a second clamping segment located opposite the first clamping segment within a second portion, and space from the axis, of the bore;

means for moving at least one of the first and second segments toward the axis of the bore to clamp any shank therebetween;

a sleeve positioned about the body and movable in an axial direction relative to the body between a retracted position, in which the sleeve is in an unclamped mode, and a forward position, in which the sleeve is in a clamped mode;

means for latching the sleeve wherein the sleeve is latched in the unclamped mode, which includes:

a radially-inwardly extended section formed in an opening of the sleeve;

a head located on an outer periphery of the body along an intermediate section of the body;

a detent mounted on the periphery of the body spaced axially from the head in a direction toward a front end of the body; and the extended section of the sleeve being located between the head and the detent when the sleeve is in the unclamped mode to preclude and movement of the sleeve toward the position of the clamped mode thereof; and means, responsive to the insertion of the shank into the bore of the body, for unlatching the sleeve to allow the sleeve to move toward the forward position.

27. The power drivable chuck as set forth in claim 26, wherein the means for unlatching comprises:

an opening formed through the body between the outer periphery of the body and the bore thereof; and a pin attached to the head and located in the opening formed through the body and having a portion extending into the bore of the body in the path of any shank inserted into the bore of the body, where, a forward end. of the shank being inserted into the bore engages the portion of the pin extending into the bore and urges the pin and the head outward whereby an engaging portion of the head engages an engaging portion of the extended section of the sleeve to move the extended section past the detent to allow the sleeve to be moved toward the clamped position thereof.

28. The power drivable chuck as set forth in claim 27, which further comprises:

the engaging portions of the head and the extended section are formed with complementary bevelled surfaces to enhance movement of the sleeve upon outward movement of the pin.

29. The power drivable chuck as set forth in claim 26, which further comprises:

an annular groove formed in the periphery of the body forward of the head; and the detent formed by a split ring which is locatable within the annular groove and normally extends partially outward of the groove.

30. A power drivable chuck for receiving and clamping a shank formed with at least one axially-directed rib on a peripheral surface thereof, which comprises:

a body having a bore therein formed about an axis thereof;

a first clamping segment located within a first portion, and spaced from the axis, of the bore and mounted to preclude movement of the segment toward the axis;

a second clamping segment located opposite the first clamping segment within a second portion, and spaced from the axis, of the bore and mounted to facilitate movement of the segment toward the axis;

a first-segment shank-engaging rib extending from the first clamping segment toward the axis;

a second-segment shank-engaging rib extending from the second clamping segment;

the first-segment rib and the second-segment rib being spaced apart to form at least one spaced groove therebetween for receipt of the rib formed on the shank; and means for urging the second clamping segment toward the first clamping segment to clamp the shank therebetween.

31. The power drivable chuck as set forth in claim 30, which comprises:

the first-segment rib being located directly opposite the second-segment rib.

32. The power drivable chuck as set forth in claim 30, wherein the shank is formed with three spaced axially-directed ribs, and where the first-segment shank-engaging rib is a first rib, and which further comprises:

a second first-segment shank-engaging rib extending from the first clamping segment toward the axis and spaced from the first-segment rib; and the first and second first-segment ribs and the second-segment rib being spaced apart to form three spaced grooves therebetween for receipt of the ribs formed on the shank.

33. The power drivable chuck as set forth in claim 1, wherein the chuck is assembled with a drill.

* * * * *